Aug. 10, 1943.                R. RODAL                    2,326,498
                    HYDROPNEUMATIC MACHINE TOOL FEED
                       Filed Sept. 22, 1939       12 Sheets-Sheet 5

Inventor.
Ralph Rodal
By Williams, Bradbury,
McCaleb & Hindle
Attys

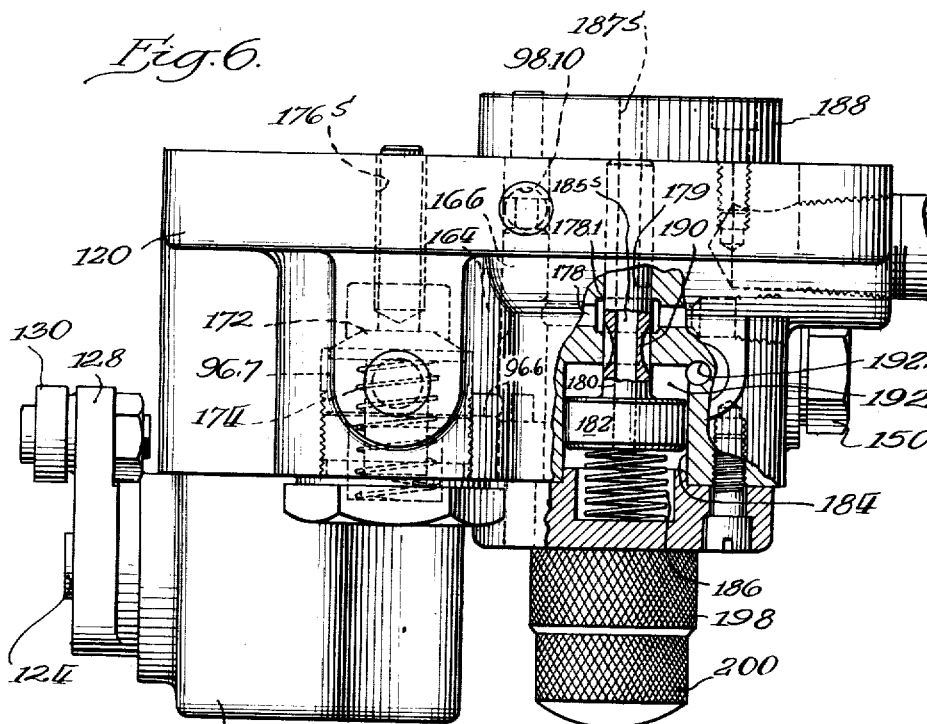
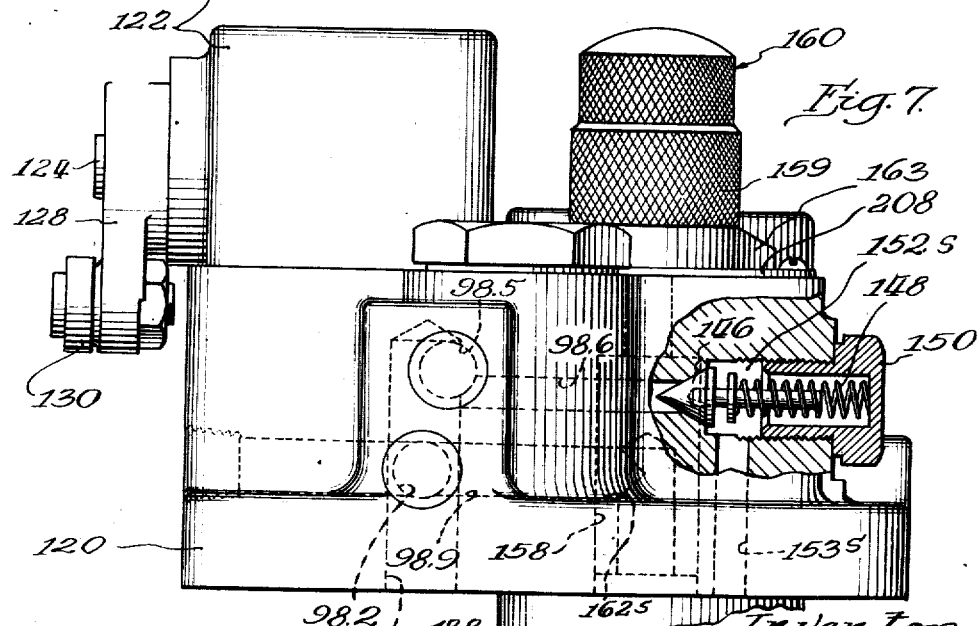

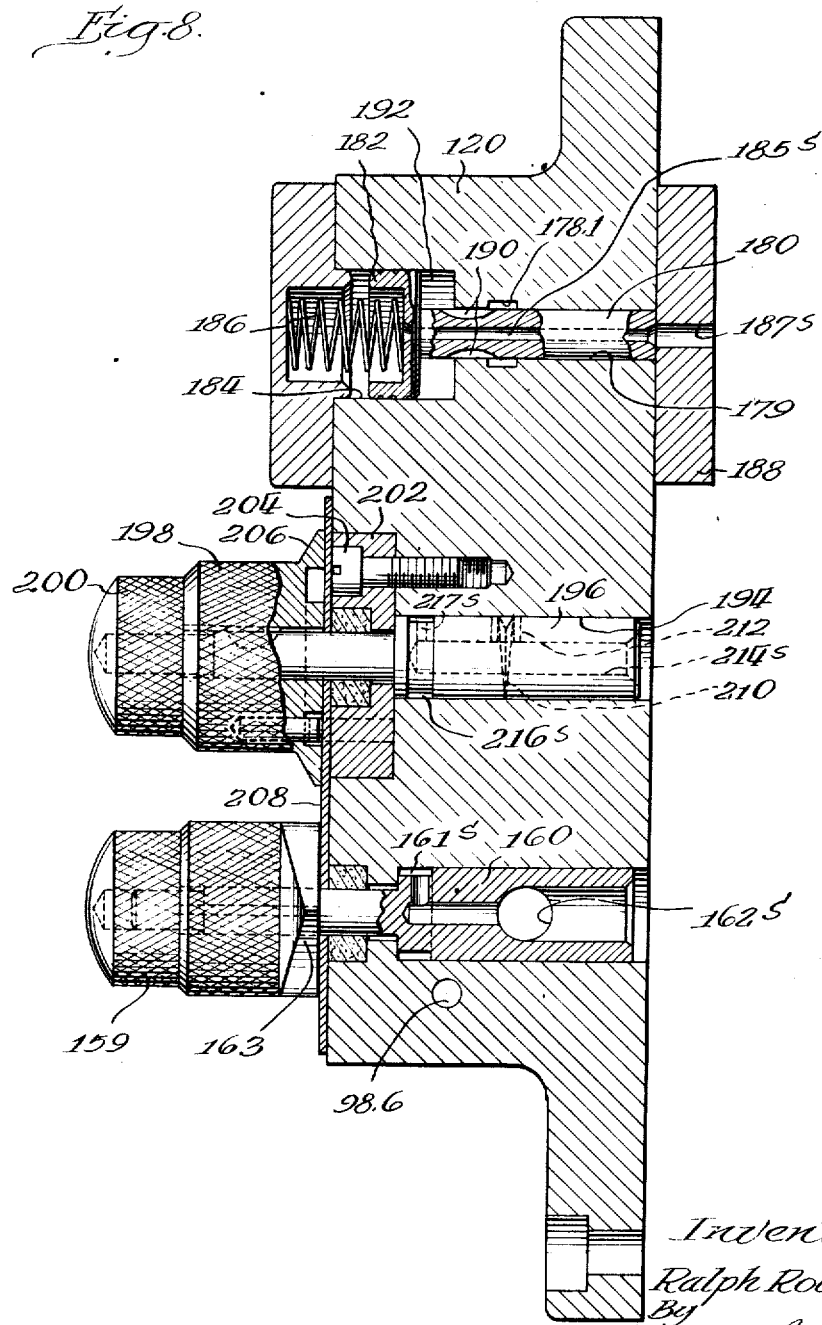

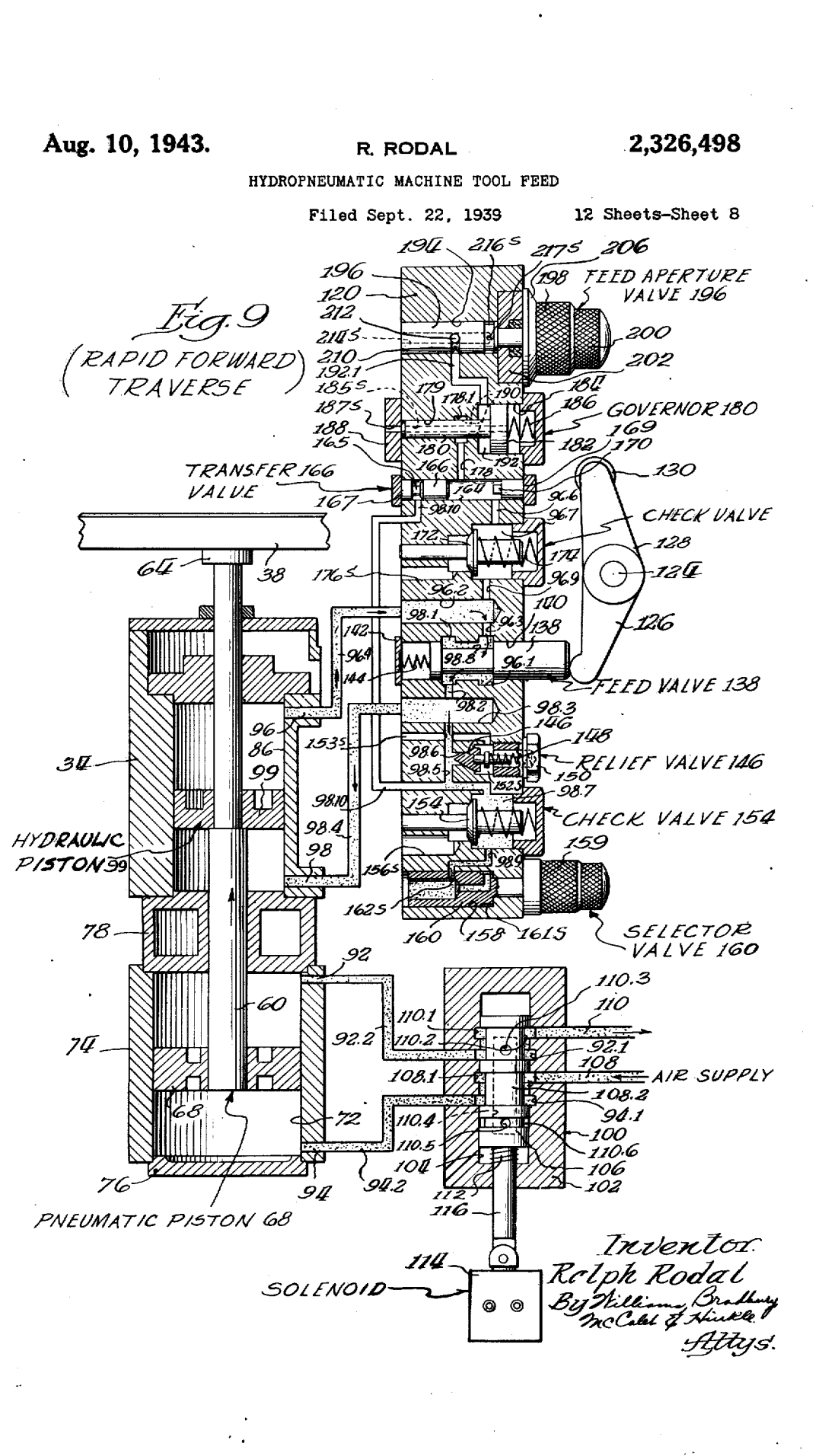

Aug. 10, 1943.  R. RODAL  2,326,498
HYDROPNEUMATIC MACHINE TOOL FEED
Filed Sept. 22, 1939  12 Sheets-Sheet 8

Aug. 10, 1943.   R. RODAL   2,326,498
HYDROPNEUMATIC MACHINE TOOL FEED
Filed Sept. 22, 1939   12 Sheets-Sheet 9

Inventor
Ralph Rodal

Aug. 10, 1943. R. RODAL 2,326,498
HYDROPNEUMATIC MACHINE TOOL FEED
Filed Sept. 22, 1939 12 Sheets-Sheet 10

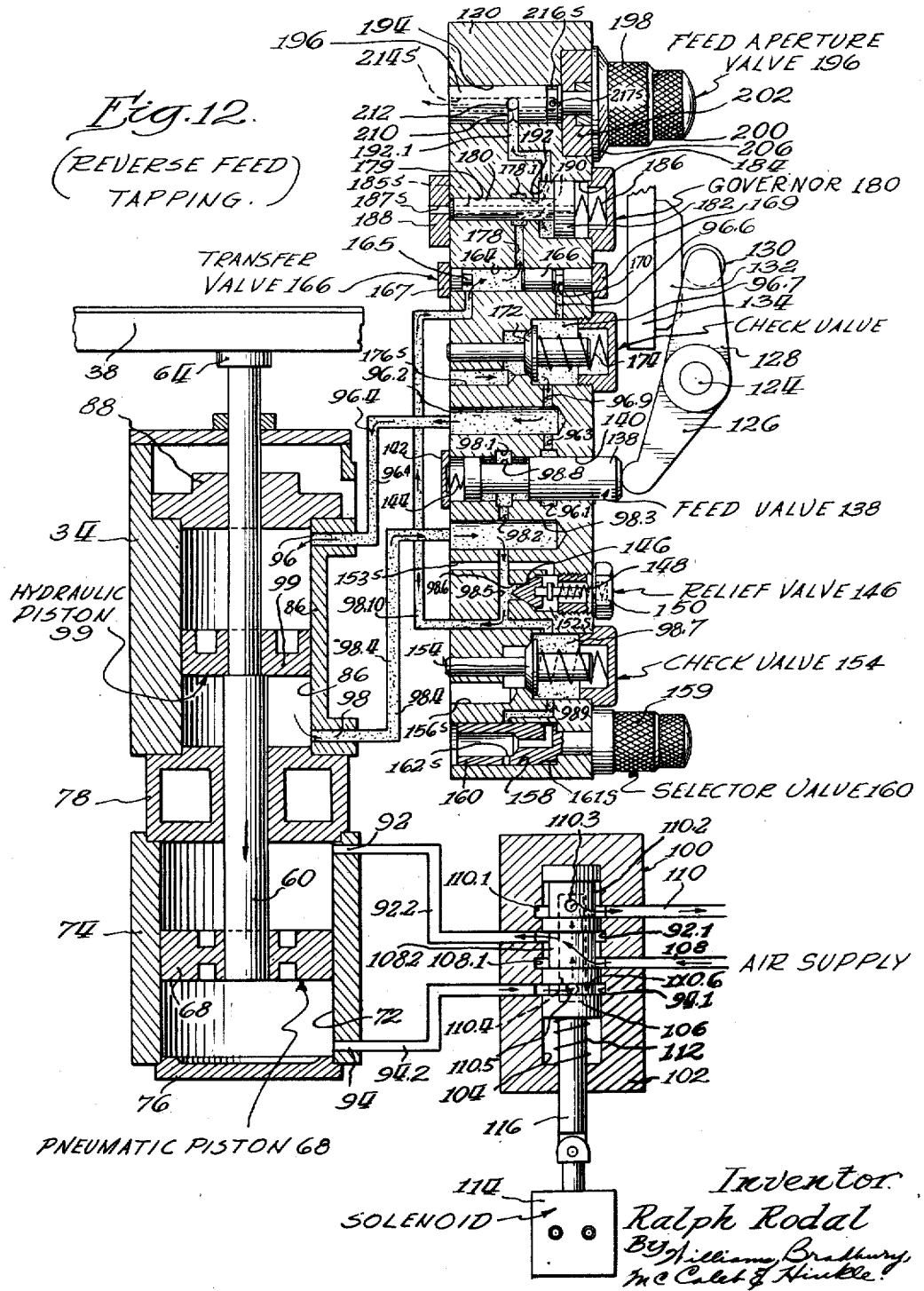

Aug. 10, 1943.   R. RODAL   2,326,498
HYDROPNEUMATIC MACHINE TOOL FEED
Filed Sept. 22, 1939   12 Sheets-Sheet 12

Inventor.
Ralph Rodal
By Williams, Bradbury,
McCaleb & Hinkle
Attys.

Patented Aug. 10, 1943

2,326,498

UNITED STATES PATENT OFFICE 2,326,498

HYDROPNEUMATIC MACHINE TOOL FEED

Ralph Rodal, Richmond, Ind., assignor to The National Automatic Tool Company, Richmond, Ind., a corporation of Indiana Application September 22, 1939, Serial No. 296,037

9 Claims. (Cl. 121—45)

My invention relates generally to machine tools, and more particularly to power operated feed apparatus for semi-automatic tapping and drilling machines.

It is an object of my invention to provide an improved feed apparatus for machine tools employing pneumatic pressure as the source of power and hydraulic devices for controlling the feed rate.

A further object is to provide an improved feed apparatus having selective hydraulic control means for causing either a drilling cycle or a tapping cycle of the machine tool.

A further object is to provide an improved feed mechanism for machine tools utilizing compressed air as the source of power, but retaining the advantages of hydraulic feed rate control.

A further object is to provide a machine tool having a work supporting table movable toward and away from the tools with an improved means for controlling the movement of said table automatically through a feed cycle suitable for drilling operations or through a feed cycle suitable for tapping operations.

A further object is to provide an improved combination electrical and hydraulic control system for a pneumatically operated means for causing proper relative motion between machine tools and a work piece.

A further object is to provide an improved hydraulic control apparatus for machine tools whereby a single feed rate controlling device is utilized to control movement of a part of a machine tool in opposite directions.

A further object is to provide an improved machine tool for tapping operations having a work feeding apparatus which is separate from and operates substantially independently of the tap rotating mechanism and may readily be applied to machine tools.

A further object is to provide an improved hydropneumatic feed apparatus for machine tools which constitutes a substantially self-contained unit which may be applied to an otherwise standard drill press or tapping machine.

A further object is to provide an improved hydropneumatic feeding apparatus for machine tools which is capable of operation through different feed rate cycles, and in which the changeover from one type of cycle to another type of cycle may be readily effected.

A further object is to provide an improved hydropneumatic table feed apparatus for machine tools in which provision is made for obtaining a selected feed rate.

A further object is to provide an improved table feed apparatus for machine tools which is pneumatically actuated and hydraulically and electrically controlled.

A further object is to provide an improved electrical control circuit for the hydropneumatic table feed apparatus of a machine tool.

A further object is to provide an improved hydropneumatic table feed apparatus for machine tools which is of simple construction, may be economically manufactured, which is readily adjustable for different types of operations, and which may readily be used by a relatively unskilled machine operator.

Other objects will appear from the following description, reference being had to the accompanying drawings in which:

Figure 6 is a top plan view of the control panel with portions thereof shown in section;

Figure 7 is a bottom plan view of the control panel with portions thereof shown in section;

Figure 8 is a sectional view on line 8—8 of Fig. 4 showing the selector valve, the feed aperture valve, and the governor valve;

Figure 9 is a diagrammatic view to illustrate the operation of the apparatus during the rapid upward movement of the table;

Figure 10 is a view similar to Figure 9 to illustrate the operation of the apparatus during the upward feeding portion of the cycle;

Figure 11 is a view similar to Figure 9 illustrating the operation of the apparatus during the downward movement of the table;

Figure 12 is a view similar to Figure 9 to illustrate the operation of the apparatus during the tapping portion of the cycle.

General description

Figure 1:
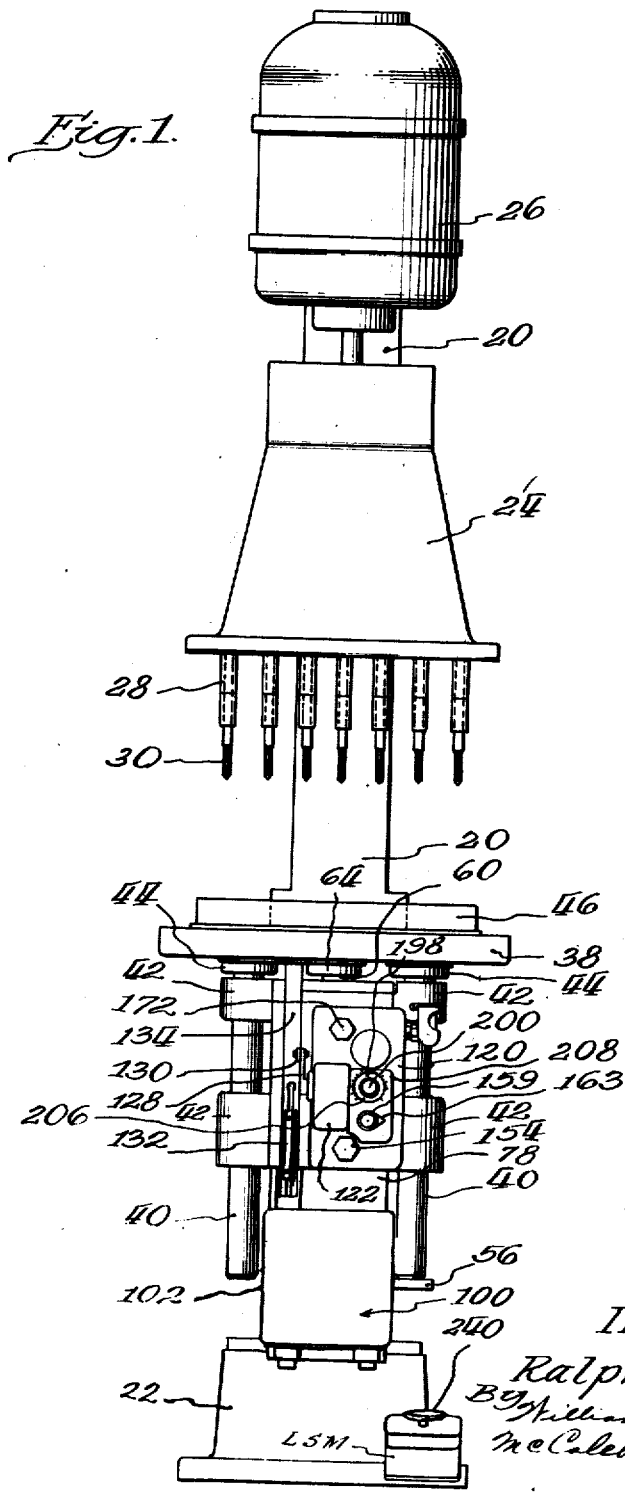
Figure 1 is a front elevational view of the complete machine tool.

My invention is illustrated as applied to a vertical column machine tool devised primarily for drilling and tapping operations. As shown in Fig. 1, the machine comprises a vertical column 20 mounted upon a base 22 and having a head 24 secured thereto. The head 24 contains the usual universal spindle driving shafts geared together to be driven by a motor 26 likewise mounted upon the column 20. The tool spindles 28 are illustrated as containing taps 30, the spindles being preferably of the "floating" type, in which a certain amount of longitudinal movement of the tool carrying tap holder relative to the spindle is permitted, resilient means being provided to pull the tool carrying tap holder upwardly (Fig. 1) with respect to the driving spindle. Of course, the tap holder is featherkeyed or otherwise connected for rotation by the spindle.

Figure 2:
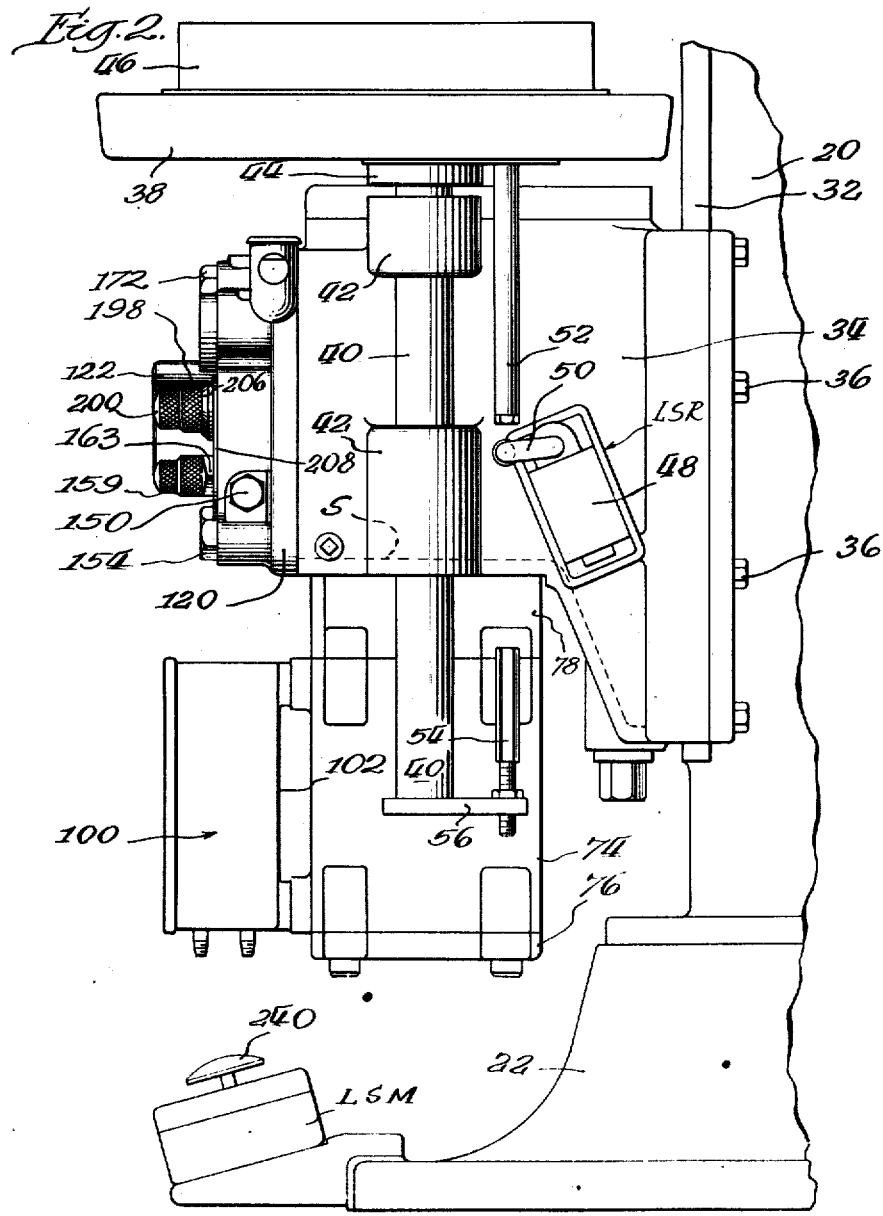
Figure 2 is a side elevational view of the lower portion of the machine tool, including the table and the hydropneumatic means for moving the table.

As best shown in Fig. 2, the column 20 has a flange 32 to which is clamped the housing casting 34 of the table raising and lowering apparatus, the housing being secured by headed studs 36 so that the entire table and its elevating apparatus may be adjustably positioned on the column 20 to the height necessary to accommodate a particular work piece.

A work piece supporting table 38 of any suitable construction is guided for vertical reciprocatory movement by a pair of rods 40 which are vertically slidable in bearings 42 which may be formed integrally with the housing casting 34. Downward movement of the table 38 is limited by engagement of a stop plate 44 which is secured to the lower surface of the table 38, with the upper plate or cover 42 secured to the top of the casting 34.

A piece of work 46 is illustrated as resting upon the table 38, it being assumed that it is located and secured thereto by such means as are customarily employed for this purpose.

A limit switch housing 48 is secured to the casting 34 and contains a switch hereinafter to be described which is actuated by an arm 50, the end of the arm carrying a roller which is adapted to be engaged by the lower end of a down stop rod 52 as the table approaches its lowermost position and is adapted to be engaged by an upper limit stop rod 54 which is adjustably secured to a rearwardly projecting arm 56 carried by the guide rod 40. Thus, the limit switch will be operated in one direction as the table approaches the upper end of its stroke and will be operated in the opposite direction as the table approaches the lower end of its stroke.

Figure 3:
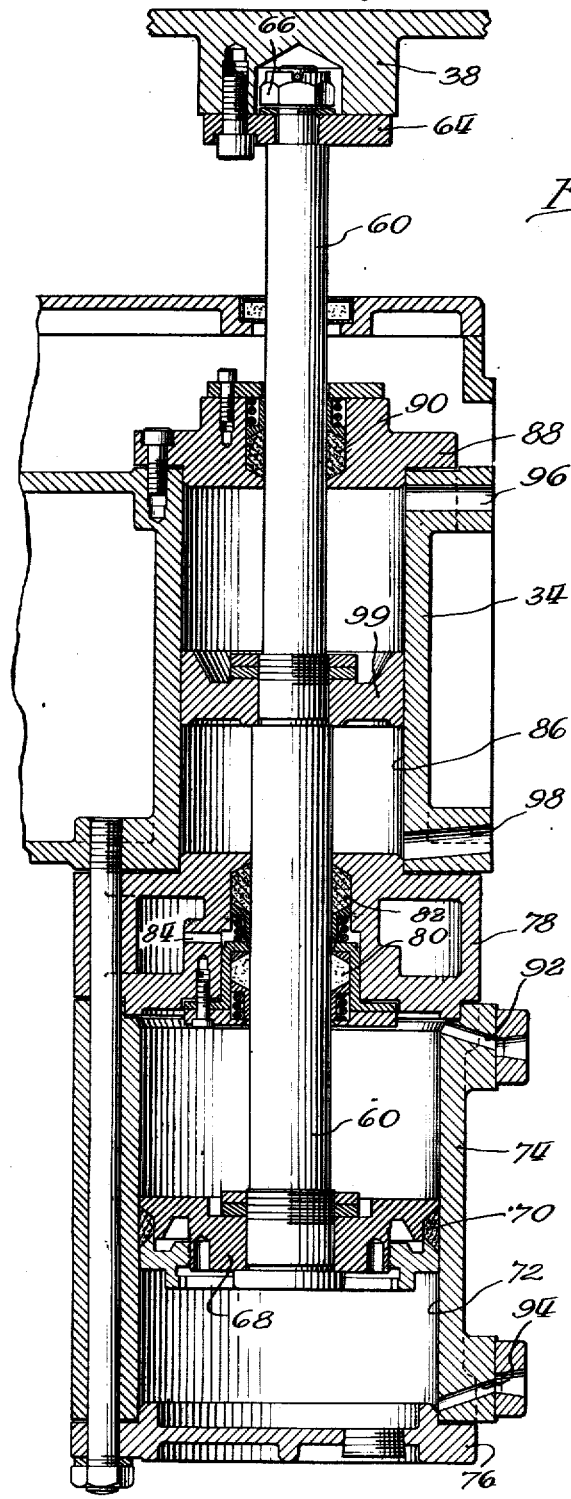
Figure 3 is a longitudinal sectional view of the pneumatic and hydraulic cylinders and their pistons used for reciprocating the work supporting table.

As best shown in Fig. 3, the table 38 is secured to the upper end of a piston rod 60 having a large diameter lower portion and a smaller diameter upper portion, the latter being secured to the table 38 by a plate 64 which is clamped to the end of the rod 60 by a nut 66. A pneumatic or air piston 68 is secured to the lower end of the rod 60. The piston 68 may be of any suitable construction, but is illustrated as made of two relatively adjustable parts for tightening packing ring 70. The piston 68 is reciprocable in a pneumatic or air cylinder 72 which is formed in a casting 74, the lower end of the casting being closed by a head 76 and the upper end being closed by an intermediate head casting 78 which is provided with a pair of self-adjusting packing glands 80 and 82, the space between said glands being open to the atmosphere through a port 84.

A hydraulic cylinder 86 is formed in the casting 34, the lower end of the cylinder 86 being closed by the casting 78 and the upper end being closed by a head 88 which contains a suitable self-adjusting packing gland 90. A hydraulic piston 99 is secured to the piston rod 60 at the juncture of the smaller and larger diameter portions thereof.

Air may be admitted to and discharged from the upper end of the air cylinder 72 through a port 92, while the lower end of the cylinder 72 has a similar port 94. The hydraulic cylinder 86 has a port 96 communicating with its upper end, and a similar port 98 communicating with its lower end.

Pneumatic actuating mechanism

The admission of air under pressure to the opposite ends of the cylinder 72, and the discharge of air therefrom is controlled by an air valve 100 which, as shown in Fig. 9, comprises a body 102 having a cylindrical bore 104 in which a valve 106 is reciprocable. Air under pressure is supplied to the air valve by a conduit 108 which communicates at all times with an annular groove 108.1 formed in the cylinder 104. (A part designated by a reference character including a decimal fraction indicates that air, hydraulic fluid, or electricity may flow freely from such part to a part bearing such reference character without the decimal fraction, without substantial hindrance or resistance.) The air valve 106 has an annulus 108.2 which in one position of the valve (as shown in Fig. 9) connects an annular groove 94.1 with the annular groove 108.1, the annular groove 94.1 communicating with the port 94 at the lower end of the air cylinder 72 through a conduit 94.2.

Air is exhausted to the atmosphere from the air valve through a conduit 110 which is connected to an annular groove 110.1. The air valve 106 has an annulus 110.2 which, when the valve is in the position shown in Fig. 9, connects the annulus 110.1 to an annulus 92.1 which communicates with the port 92 at the upper end of the air cylinder through a conduit 92.2.

When the air valve 106 is in its upper position, as indicated in Fig. 11, the exhaust conduit 110 is connected to the conduit 94.2 through the annulus 110.2, a radial port 110.3 formed in the valve 106, an axial bore 110.4 formed in the valve body, a radial port 110.5 and an annulus 110.6 formed in the valve 106.

At the same time, the air supply conduit 108 is connected to the conduit 92.2 through the annular groove 108.1, annulus 108.2 and annular groove 92.1. The valve 106 is normally held in its uppermost position, as shown in Fig. 11, by any suitable means indicated as a compression coil spring 112, and is adapted to be moved to its lower position by a solenoid 114 which is suitably connected to the stem 116 of the valve 106.

From the foregoing description of the air valve, it will be apparent that when the solenoid 114 is energized and the air valve 106 in its lowermost position, air under pressure will be admitted to the lower end of the pneumatic cylinder 72 and permitted to discharge to the atmosphere from the upper end of said cylinder. As a result, the piston 68 will be forced upwardly to raise the table 38. Conversely, when the solenoid is de-energized and the air valve 106 moved to its uppermost position by the spring 112, air under pressure will be admitted to the upper end of the air cylinder 72 and permitted to discharge to the atmosphere from the lower end of said cylinder. The solenoid 114, the air valve 106, and air piston 68, together with their associate parts, thus constitute the means for actuating the table, that is, elevating and lowering it.

Hydraulic control apparatus

The above described pneumatic actuating mechanism could not, however, feasibly be utilized to control the rate of actuation of the table because of the difficulties inherent in pneumatic controls, due to the compressibility of air. It will be understood that for the proper operation of the machine tool, the table must be moved at certain accurately controlled speeds, and that such movement must not be appreciably affected by resistance to movement of the table due to the engagement of the work with the tools, or due to any other cause.

I have therefore provided the hydraulic cylinder 86 and its piston 99, together with a hydraulic control valve apparatus for controlling the flow of the hydraulic fluid (hereinafter referred to as oil) into and out of the opposite ends of the cylinder 86. This apparatus is composed of a plurality of valves and communicating passageways, most of which are formed in or mounted upon a panel 120 which is secured to the casting 34.

It will be understood that the casting 34 is hollow to provide a reservoir or sump S for oil, so that all passageways formed in the panel and extending through the inner surface thereof are in direct communication with the sump to receive oil therefrom and to discharge oil thereinto, such passageways being distinguished by the suffix S to the reference characters applied thereto.

Mounted upon the panel 120 is a housing 122 providing bearings for a shaft 124 which has an arm 126 rigidly secured intermediate its ends, and another arm 128 secured at its end which projects from the housing 122.

The arm 128 carries a roller 130 at its extremity for engagement with a cam 132 (Figs. 1 and 4) which is adjustably secured to a rod 134 which depends from the table 38. Thus, when the roller 130 strikes the cam 132, it is shifted clockwise (Fig. 5) causing the arm 126 to engage the end of a feed valve 138 which is reciprocable in a cylindrical bore 140 formed in the panel 120. The bore 140 has an annular groove 96.1 which communicates with a drilled passageway 96.2 through a port 96.3, the passageway 96.2 communicating with the port 96 at the upper end of the hydraulic cylinder 86 through a conduit 96.4.

The valve 138 has an annulus 98.8 which is always in communication with the annular groove 98.1. The inner end of the bore 140 is closed by a plate 142. A spring 144 is compressed between the plate 142 and the inner end of the valve 138.

When the valve 138 is in its outer position, its annulus 98.8 connects the annular groove 96.1 with an annular groove 98.1 which is connected by a duct 98.2 with a drilled passageway 98.3, the latter being connected by conduit 98.4 with the port 98 at the lower end of the hydraulic cylinder 86. The passageway 98.3 is connected by means of a duct 98.5 with a pressure relief valve port 98.6 which is normally closed by a pressure relief valve 146, which is held against its seat by a compression spring 148 seated in the bore of a plug 150.

A chamber 152S is connected by a passageway 153S to the sump.

The duct 98.5 has one branch leading to a bore 98.7 behind a spring pressed check valve 154 which prevents flow of oil from the chamber 98.7 to a passageway 156S. The chamber 98.7 is connected by a passageway 98.9 with a bore 158 in which a selector valve 160 is rotatable, the selector valve having a port 162S which is adapted to register with the end of the passageway 98.9 and thus connect the latter with the sump.

Figure 4:
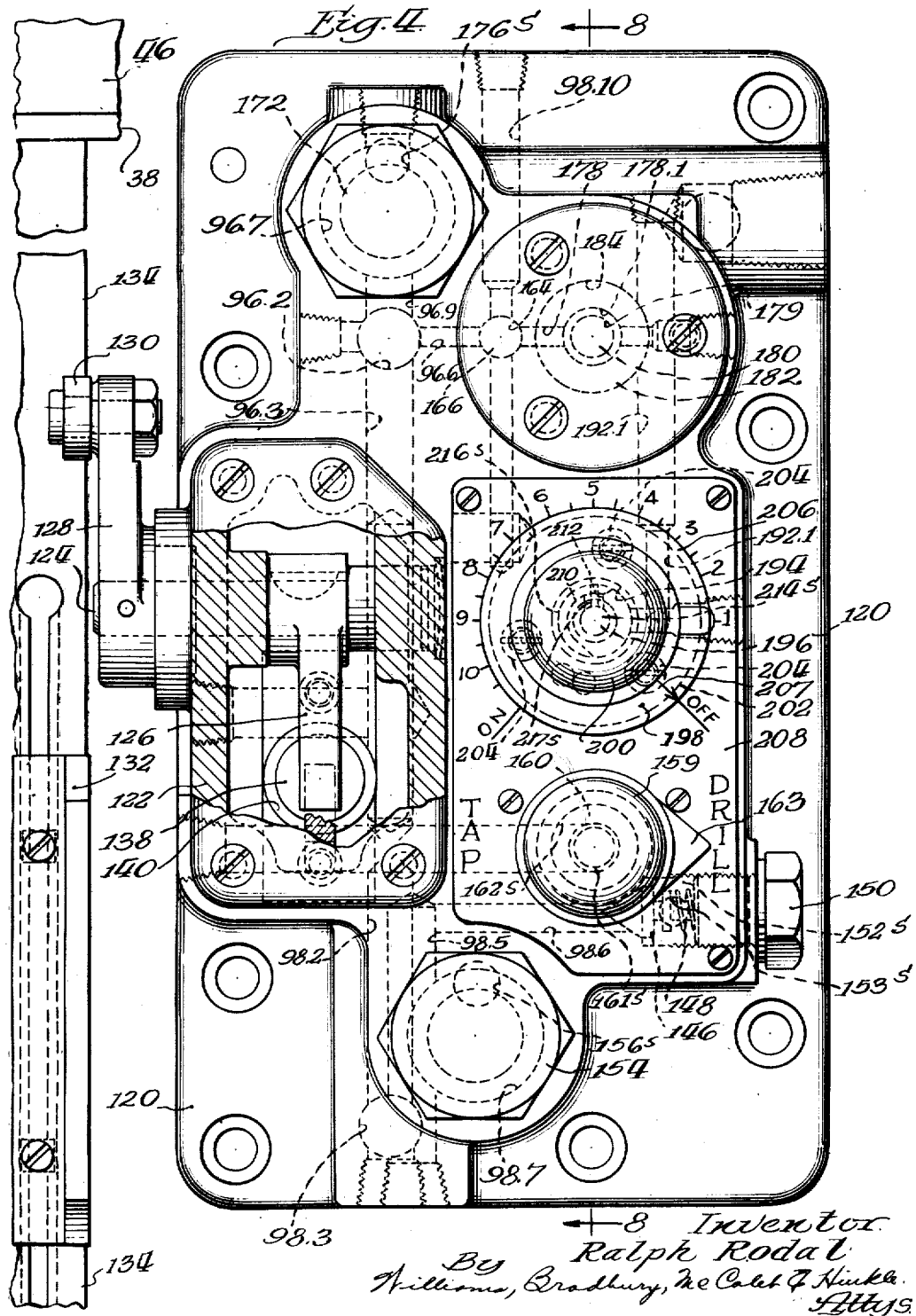
Figure 4 is an enlarged front elevational view of the hydraulic control panel, portions thereof being broken away better to show the internal construction.
Figure 5:
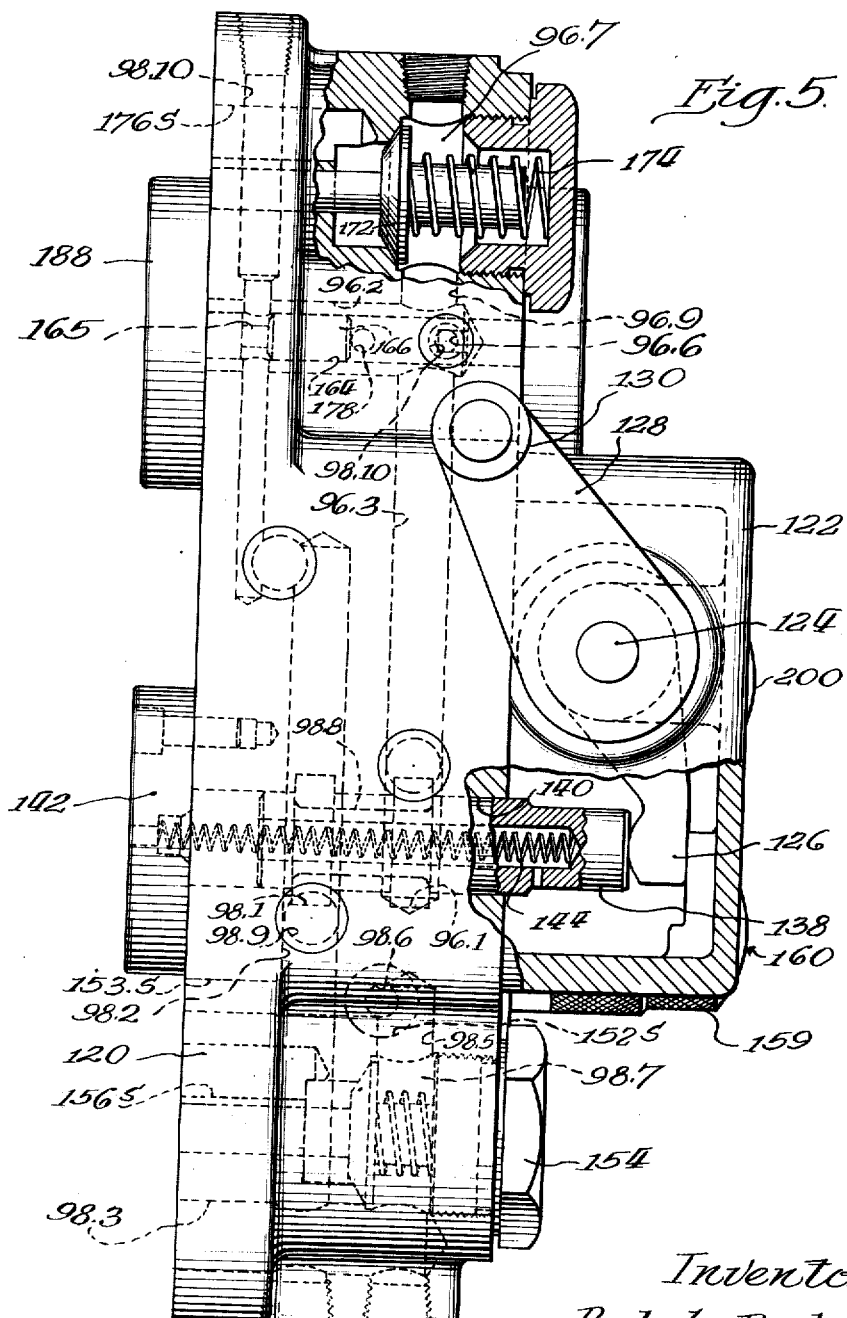
Figure 5 is a side elevational view of the control panel, portions thereof being shown in section.

As shown in Fig. 4, the selector valve is provided with an adjustment knob 159 which has a pointer 163 formed integrally therewith, the valve being adapted to be rotated through an angle of approximately 180° to point either to the legend "Drill" or the legend "Tap."

Referring again to Fig. 9, the duct 98.5 is connected by a passageway 98.10 with the inner end of a transfer valve cylinder 164 in which a plunger 166 is freely reciprocable, the plunger being prevented from covering up the end of the passageway 98.10 by a projection 165 from a plate 167 which closes the inner end of the cylindrical bore 164. A similar plate 169 having a projection 170 closes the outer end of said cylinder 164.

Near the outer end of the cylinder 164 is a port 96.6 which connects this end of the cylinder with a chamber 96.7 behind a check valve 172 which is held against its seat by a spring 174 normally to prevent flow of oil from the chamber 96.7 through a passageway 176S to the sump. A passageway 178 connects the central portion of the cylinder 164 with an annulus 178.1 formed in a governor valve cylinder 179.

The governor valve 180 is formed integrally with a piston 182, the latter being reciprocable in a cylinder 184, the piston 182 with its valve 180 being normally pressed inwardly (to the left Fig. 9) by a compression coil spring 186. The valve 180 and its piston 182 have a drilled hole 185S extending axially, therethrough and communicating with the sump through an aperture 187S formed in a plate 188 which covers the end of the governor valve cylinder 179.

A pair of arcuate slots 190 are formed in the governor valve 180 and normally connect the annular groove 178.1 with the space 192 which is formed between the end of the bore 184 and the left side (Fig. 9) of the piston 182. The governor valve 180 operates to prevent the pressure within the space 192 from building up to a value exceeding that predetermined by the spring 186, since any tendency for the oil pressure in the space 192 to exceed this predetermined value causes the valve 180 to move to the right (Fig. 9), due to the pressure upon the piston 182, and thus decreasing the areas of the arcuate slots 190 which communicate with the annular groove 178.1.

The passageway 192.1 from the space 192 leads to the cylinder 194 for a feed aperture valve 196 which is rotatable in the bore 194, and has a dial knob 198 secured thereto by a cap nut 200.

As best shown in Fig. 8, the stem of the valve 194 is suitably packed in a bushing 202 which is secured to the panel 120 by cap screws 204.

The dial knob 198 has a bevel surface 206 having a pointer 207 marked thereon for cooperation with number marked graduations formed on a dial plate 208, as best shown in Fig. 4.

The valve 196 has a V-shaped arcuate groove 210 cut therein adjacent the end of the passageway 192.1, this groove communicating through a radial port 212 with an axially drilled hole 214S. An annular groove 216S communicates with the drilled hole 214S through a radial port 217S, the latter groove and port serving to prevent oil leaking along the outer cylindrical surface of the valve 196 from being forced under pressure through the packing in the bushing 202, and instead permitting any such oil leakage to drain directly to the sump.

The degree of restriction offered by the feed aperture valve 196 is determined by the angular position of this valve, since the V-shaped groove 210 is of gradually increasing depth and thus its minimum cross-sectional area, which substantially determines the rate at which oil may flow through the valve, varies as the valve is rotated through an angle represented by the graduations marked "On" and "Off" on the dial plate 208 (Fig. 4).

As shown in Fig. 8, the selector valve 160 is likewise provided with an annular groove 161S which is in direct communication with the axial bore in the valve through a radially drilled port, and thus prevents leakage of oil under pressure past the stem of the valve.

It will be noted that substantially all of the valves of the hydraulic control apparatus are removable from the front of the panel 120 for inspection, repair, or replacement, without making it necessary to disassemble the panel 120 from the machine as a whole, and without making it necessary to remove more than one valve at a time, since each of the valves is held in place by an individual packing bushing or has its bore closed by an individual cap nut or the like.

Electrical controls

Figure 13:
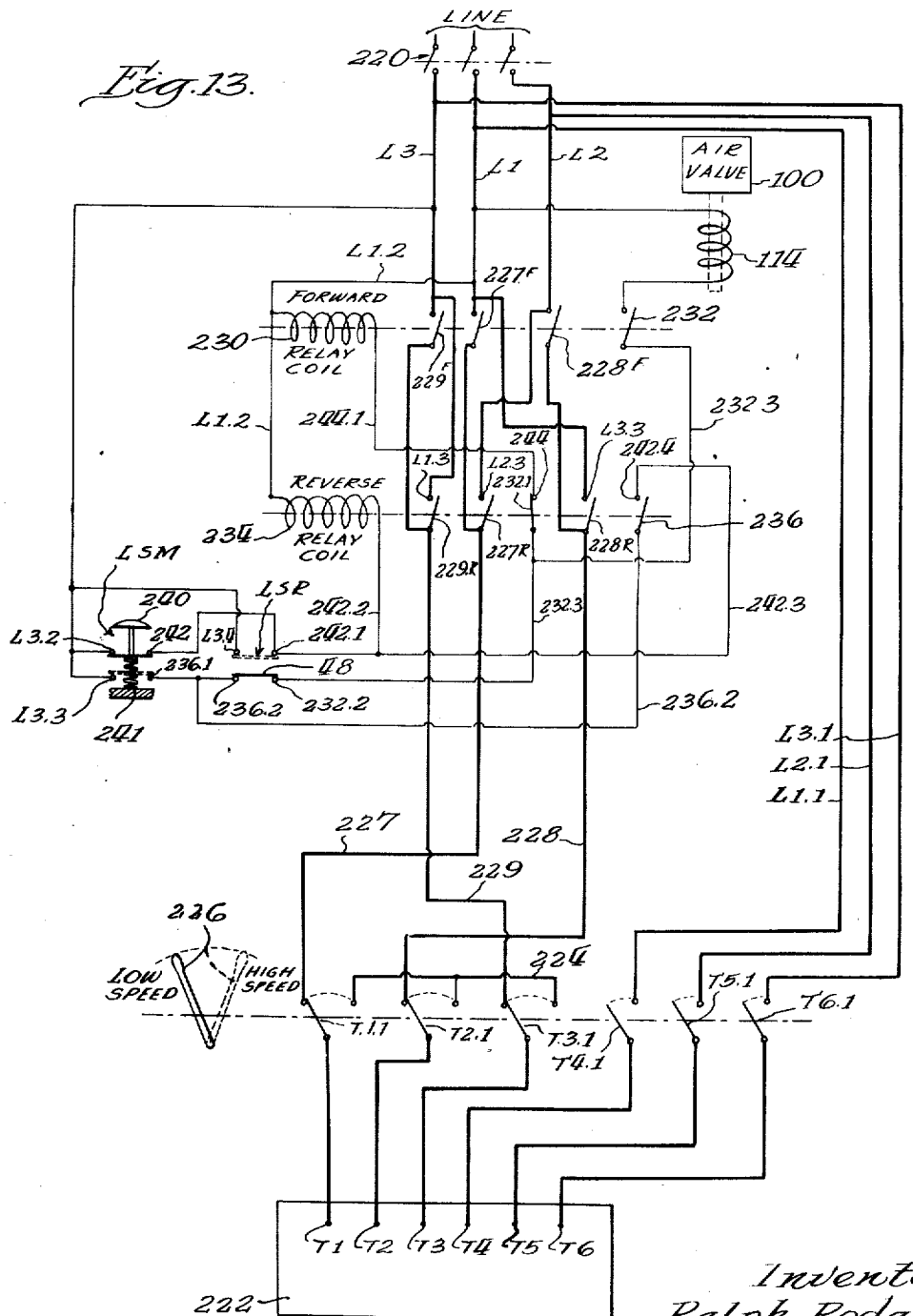
Figure 13 is a wiring diagram of the electrical control circuits.

The diagram of the electrical control circuits is shown in Fig. 13 and comprises line conductors L1, L2 and L3 which are adapted to be connected to a suitable source of three-phase current by a three-pole single-throw switch 220.

The motor 26 is a three-phase two-speed motor and has a terminal panel 222 for its wiring connections, this panel having terminals T1 to T6 thereon, the motor operating as a high speed motor when its terminals T1, T2 and T3 are connected together and its terminals T4, T5 and T6 connected respectively to lines L1, L2 and L3, such connection being effected by a six-pole switch, three switches T4.1, T5.1 and T6.1, being of the single-throw type to make connection of the corresponding terminals with the conductors L1.1, L2.1 and L3.1, respectively. The six-pole switch has three additional poles T1.1, T2.1 and T3.1 which are adapted to be connected together by a conductor 224 when the switches are thrown to the right by any suitable means indicated diagrammatically, as a lever 226.

When the six-pole switch is in the position shown in Fig. 13, the switches T4.1, T5.1 and T6.1 are opened and the switch poles T1.1, T2.1 and T3.1 are connected respectively to conductors 227, 228 and 229.

When the motor 26 is to be driven in a forward direction, i. e. a direction advancing the drills or taps into the work, the coil of a forward relay 230 is energized, as will appear hereinafter, and switches 229F, 227F and 228F are closed, as is also a switch 232 which controls the energization of the winding of the air valve controlling solenoid 114 as will be described hereinafter. It will thus be seen that upon energization of the forward relay 230 the line conductors L1, L2 and L3 will be connected respectively to the conductors 227, 228 and 229, the latter being connected respectively to terminals T1, T2 and T3 when the switch lever 226 is in the low speed position in which it is shown in Fig. 13.

A reverse relay 234 is energized only when the forward relay 230 is de-energized, as will appear hereinafter, and when energized closes switches 229R, 227R and 228R, as well as a switch 236, and opens a switch 232.1.

As shown in Figs. 1 and 2, a foot-operated switch LSM is attached to the base 22, this switch being operated by depressing a button 240 against the force of a compression spring 241. When in its normal position, the switch LSM connects a switch terminal L3.2 with a switch terminal 242 and when in depressed position connects a switch terminal L3.3 with a terminal 236.1.

The limit switch LSR contained in the housing 48 and actuated by the arm 50 (Fig. 2) is normally in the position shown in full lines in Fig. 13 connecting switch terminal 236.2 with switch terminal 232.2, and when it is moved to its dotted line position (because of the engagement of the adjustable stop 54 with the roller on the end of the arm 50—Fig. 2) the switch LSR connects terminals L3.4 with a terminal 242.1. The terminal 242.1 is connected by a conductor 242.2 with one end of the coil of the reverse relay 234 and by conductor 242.3 with a switch contact 242.4 for engagement by the switch 236. The other end of the coil of relay 234, and one end of the coil of relay 230 are connected by a conductor L1.2 with the line conductor L1. A conductor 232.3 connects the switch arm 232 with the switch arm 232.1 and with the terminal 232.2.

The switch arms 229R, 227R and 228R cooperate with switch contacts L1.3, L2.3 and L3.3 respectively, while the switch arm 232.1 is adapted to engage a switch contact 244 which is connected by a conductor 244.1 with the end of the coil of relay 230.

The operation of the electrical control circuits and apparatus will be described in conjunction with the following description of the operation of the machine as a whole.

Drilling operation

The operation of the machine will be described first when the machine is used to perform a simple drilling operation.

Assuming that the work has been properly clamped to the table 38 and that the main switch 220 has been closed to supply current to the line conductors L1, L2 and L3, and assuming further that the motor speed control lever 226 is in the dotted line position in which it is shown in Fig. 13, the machine is in condition for operation upon depression of the button 240. The operator steps on this button and holds it depressed until an operating cycle of the machine has been completed. The switch LSR is in the position shown in full lines in Fig. 13, due to the engagement of its operating arm 50 with the stop arm 52 at the end of the preceding cycle, and therefore upon moving the switch LSM to the dotted line position of Fig. 13, the following circuit is completed: Line L3, switch contacts L3.3 and 236.1, switch contact 236.2, LSR switch, contact 232.2, conductor 232.3, switch arm 232.1 which is normally closed and thus connected with switch contact 244, conductor 244.1, coil of relay 230, conductor L1.2 to line conductor L1.

The energization of the relay 230 through the circuit just traced causes closure of the four switches associated with this relay, these switches upon their closure serving to connect conductors L3, L1 and L2 to conductors 229, 227 and 228 respectively, but during a drilling operation, when the control lever 226 is in its dotted line position (Fig. 13), the closure of these switches has no useful effect.

Energization of the relay 230 also closes switch 232 and the closure of this switch results in energization of the winding of solenoid 114 through a circuit traced from the LSR switch, contact 232.2, conductor 232.3, switch 232, winding of solenoid 114 to line conductor L1.

The electrical control apparatus is thus in condition to commence a forward (upward) traverse of the table 38. Such upward travel is initiated by the energization of the solenoid 114 which pulls the air valve 106 downwardly to the position in which it is shown in Fig. 9, thereby connecting the air supply conduit 108 with the lower end of air cylinder 72, and connecting the upper end of air cylinder 72 with the exhaust conduit 110.

The differential pressure on the air piston 68 thus causes upward travel of this piston and hence of the rigidly connected hydraulic piston 99.

If it were not for the braking effect of the hydraulic piston, the table would be pneumatically elevated at a rapid uncontrolled rate and would be affected by variations in the resistance to travel of the table and parts moving therewith.

Upon upward movement of the hydraulic piston 99, oil is discharged from the upper end of the hydraulic cylinder 86 through outlet 96, conduit 96.4, passageway 96.2, duct 96.3, annular groove 96.1, annulus 98.8, port 98.2 to passageway 98.3 and hence through conduit 98.4 to the lower end of the hydraulic cylinder 86. It will be noted, however, that the oil will be displaced from that portion of the cylinder 86 above the piston 99 at a more rapid rate than the oil can feed into the lower end of the cylinder 86, due to the fact that the rod 60 is of two diameters. Thus, such oil as cannot be forced into the lower end of the cylinder 86 feeds from the passageway 98.3 through passageway 98.5 to the space 98.7 behind the check valve 154 and hence through the passageway 98.9 and port 162S to the sump, since the port 162S is in registry with the end of the passageway 98.9 when drilling operations are to be performed, as determined by setting the pointer 163 of the selector valve knob 159 to the legend "Drill" as shown in Fig. 4.

After the table 38 has been elevated to a position where the drills are about to engage the work piece, the roller 130 on the feed valve actuating arm 128 engages the cam 132 and is swung clockwise thereby to the position in which it is shown in Fig. 10, thus moving the feed valve 138 to a position in which it prevents the escape of oil through the port 96.3. Therefore the oil is constrained to flow through the port 96.9 into the space 96.7, behind the check valve 172, thence through passageway 96.6 to the outer (right-hand—Fig. 10) end of the transfer valve cylinder 164, causing the transfer valve 166 to move to the left and thus permitting free flow of oil from the passageway 96.6 through the cylinder 164 into the passageway 178 leading to the annular groove 178.1 of the feed governor 180 in the direction as indicated by the arrows in Fig. 10.

From the space 192 beneath the governor piston 182, in which space it will be recalled the pressure is accurately maintained at a predetermined value, the oil flows through passageway 192.1 through the feed aperture formed by the groove 210 in the feed aperture valve 196, and thence through the radial port 212 and axially drilled passageway 214S to the sump. The last described circuit for the flow of oil from the passageway 96.2 to and through the feed aperture valve forms the only path for escape of oil from the upper end of the hydraulic cylinder 86, and thus the position at which the feed aperture valve is adjusted determines the rate at which the table 38 is elevated to feed the work toward the tools.

Since the pressure in the space 192 behind the governor piston 182 is very accurately maintained by the governor valve, the rate of flow of oil through the feed aperture valve is extremely uniform at any particular rate to which the feed aperture valve may be adjusted.

The table 38 is thus elevated at the desired feed rate until the adjustable stop 54 operates the limit switch lever 50 (Fig. 2) to move limit switch LSR from the full line position (Fig. 13) to the dotted line position. As soon as such movement of this switch takes place, the circuit, including the normally closed switch 232.1, conductor 232.3, conductor 244.1 and the winding of the forward relay 230, is broken, and the de-energization of the forward relay 230 results in opening the switches 229F, 227F, 228F and 232. The opening of the first three of these switches has no useful effect during drilling operations since during such operations the lever 226 is in its full line position. The opening of the switch 232 results in de-energization of the solenoid 114, so that as a result, the air valve 106 moves from the position in which it is shown in Figs. 9 and 10 to its opposite position in which it is shown in Fig. 11, from which it will be noted that the air supply conduit 108 is connected to the port 92 so as to admit air to the upper end of the air cylinder 72, while the exhaust conduit 110 is connected to the lower end of the air cylinder 72.

At the same time that the air valve 106 is reversed, the direction of rotation of the motor 26 is also reversed only if the switch lever 226 is in its full line position, due to the completion of the following circuits. When the limit switch LSR is moved to its dotted line position at the completion of the upward or forward feeding stroke of the table, the switch contact L3.4 is connected to switch contact 242.1, and as a result current is supplied from the line L3 through these switch contacts and conductor 242.2 to the winding of reverse relay 234.

The energization of this relay results in closure of switches 229R, 227R, 228R and 236, and opening switch 232.1. Closure of the switches 229R, 227R and 228R has no useful effect since the switch arm 226 is in its full line position.

Opening of the switch 232.1 results in breaking the circuit to the coil of the forward relay 230.

Closure of the switch 236 by the energization of the reverse relay 234 closes a holding circuit for the coil of the reverse relay, this circuit being traced as follows: From the switch terminal L3.3, switch LSM, switch contact 236.1, conductor 236.2, switch 236, switch contact 242.4, conductor 242.3, conductor 242.2, coil of relay 234 and conductor L1.2. Thus, the movement of the limit switch LSR from its full line to its dotted line position results in reversing the air valve 106 and establishing a holding circuit for the coil of reverse relay 234, as well as de-energizing relay 230.

When compressed air is thus supplied to the upper end of air cylinder 72, downward movement of the hydraulic piston 99 commences, and oil flows from the lower end of the hydraulic cylinder 86 through conduit 98.4 and into passageway 98.3. Since during the initial portion of the downward or reverse stroke of the table the feed valve 138 is still in closed position, the oil cannot flow from the passageway 98.3 to the passageway 96.2 and hence to the upper end of the hydraulic cylinder 86, but instead flows to the sump through the following path: From the passageway 98.3 through passageway 98.5 to space 98.7, behind check valve 154 through passageway 98.9 and port 162S to the sump. At the same time, oil flows into the upper end of cylinder 86, through passageway 176S, past check valve 172, into the chamber 96.7 behind the check valve, and hence through part 96.9 to the passageway 96.2 which is connected to the upper end of the cylinder 86.

The table thus moves rapidly in the reverse or downward direction, the speed with which it moves being determined only by the rate at which the oil flows through the relatively free circuits last above described.

As the table 38 approaches the end of its downward or reverse traverse, the stop 52 engages the roller on the arm 50 and thereby moves the limit switch LSR from the position in which it is shown in dotted lines in Fig. 13 to the full line position.

The breaking of the connection between switch contacts L3.4 and 242.1 does not result in de-energization of the winding of the reverse relay 234 since the latter remains energized through the holding circuit which includes the switch 236 and conductors 236.2, 242.3 and 242.2.

The downward movement of the table is arrested by engagement of the table with a stop on the cover plate 42. The machine thus comes to rest and a new cycle cannot be initiated until the operator releases his foot from the control button 240, whereupon the spring 241 forces the switch LSM from its dotted line position to its full line position (Fig. 13), thus disconnecting the switch contact 236.1 from the line L3 and thereby breaking the holding circuit previously described for the reverse relay 234.

A circuit to the winding of the reverse relay 234 is, however, substantially immediately re-established through the switch contact L3.2, switch LSM, switch contact 242 to switch contact 242.1, and hence through conductor 242.2 to the winding of relay 234. The circuits are thus in their original condition ready for the initiation of a new cycle by depressing the foot button 240, as previously described.

*Tapping operation*

When a tapping operation is to be performed, the switch lever 226 must be in its full line position, and the selector valve 160 is rotated through approximately 180°, with its pointer 163 pointing to the legend "Tap" on the dial plate 208. Such rotation of the selector valve shuts off the possibility of flow of oil through the passageway 98.9, since the port 162S of the selector valve is no longer in registry with the end of this passageway.

For a tapping operation, the feed aperture valve 196 will be adjusted for a feed rate slightly less than that which would be required for the taps to feed into the work without movement relative to the spindles by which they are rotated.

After making these necessary adjustments, the operator depresses the foot button 240 to operate the switch LSM in a manner previously described with reference to Fig. 9 to secure rapid forward (upward) traverse of the table, except that due to the fact that the end of the passageway 98.9 is closed by the selector valve 160, the excess of the oil displaced from above the hydraulic piston 99 over that required to fill the space below this piston cannot escape through the passageway 98.9 to the sump, but instead must flow from the passageway 98.3 through passageway 98.5 through the conduit 98.10 to the left-hand (inner) end of transfer valve cylinder 164 or through passageway 96.9, bore 96.7, passageway 96.6 to the right-hand (outer) end of the transfer valve cylinder 164. Oil flows from the transfer valve cylinder 164 through the passageway 178 through the governor valve, and hence through the feed aperture valve to the sump.

The latter path offers considerable resistance to the flow of oil and the pressure in the passageway 98.5 may therefore be built up sufficiently to overcome the force of the spring 148 and raise the relief valve 146 from its seat to permit escape of oil from the passageway 98.5 past the check valve 146 and through passageway 153S to the sump.

It will be understood that during the forward or upward traverse of the table with the parts shown in the positions in which they are illustrated in Fig. 9, both ends of the transfer valve cylinder 164 will be connected, as above described, to the conduit 96. The oil will flow through one or the other of these paths, depending upon the position in which the transfer valve 166 happens to be located.

If the excess of oil displaced from the upper end of the hydraulic cylinder by the piston 99 (over that required to fill the space below the piston 99) cannot escape to the sump sufficiently rapidly through the governor valve 180 and feed aperture valve 196, the oil may also escape to the sump past the relief valve 146 and through passageway 153S.

The spring 148 which holds the relief valve 146 against its seat must be capable of holding the valve closed against relatively high pressures exerted upon its face. It must, however, permit the valve to open under some circumstances. For example, if the transfer valve 166 should happen to be in an intermediate position closing off the end of the passageway 178, the escape of oil through the governor valve and feed aperture valve would be entirely blocked, since there would be no force tending to move the transfer valve from such central position because both ends of this valve would be subjected to the same pressure under these conditions. Thus the only path for escape of this excess oil to the sump would be past the relief valve 146. Similarly, if the feed aperture valve 196 should be closed, the only escape of the excess oil to the sump would be past the relief valve 146.

The spring 148 which holds the valve 146 against its seat must, however, be sufficiently strong to hold this valve in closed position during the feed reverse traverse, for under these circumstances the rate of movement of the piston must be controlled by the rate at which oil flows from beneath the piston 99 to the sump through the governor valve 180 and feed aperture valve 196.

During the upward or forward traverse stroke of the piston, the air pressure is exerted over the total area of piston 68 and the total force exerted by this piston is available to exert pressure against an effective area determined by the difference between the cross sectional areas of the two portions of the piston rod 60, with the result that, potentially, a very high hydraulic pressure may be developed during this portion of the cycle.

On the other hand, during the reverse feed, the air pressure is exerted over a smaller effective area of the piston 68 (the area of the piston less the area of the rod 60) and the total downwardly directed force upon the piston rod 60 is less than can be exerted upon this rod in an upward direction (neglecting friction, the weight of the pistons, rod, and table). Furthermore, this lesser force applied to the piston rod 60 operates against the effective area of the lower face of piston 99, which is much greater than the difference in the areas of the two portions of the piston rod.

Thus the pressure per square inch which can be developed beneath the hydraulic piston 99 on the downward stroke is considerably less than the pressure per square inch which can be developed above the piston 99 during the rapid forward traverse movement. The spring 148 can therefore readily be made of such strength that the valve 148 will open to permit discharge to the sump of excess oil during the rapid forward traverse or upward movement of the piston 99, but will not open under the reduced unit hydraulic pressure which will be developed beneath the piston 99 during the reverse feed portion of the cycle. As a result, during reverse feed, the speed of operation will be controlled solely by the rate at which the oil can escape past the governor valve 180 and the feed aperture valve 196.

As illustrative of the above explanation of the operation of the relief valve 146, in a particular machine embodying the invention (again neglecting friction and the air pressure of the parts, and assuming a given air pressure), a pressure of 190 pounds per square inch can be built up below the piston 99 during the downward or reverse feed portion of the cycle. Thus the spring 148 must be strong enough to keep the valve 146 closed with a pressure of 190 pounds per square inch in the passageway 98.5. On the other hand, during the rapid forward traverse, a pressure of 3370 pounds per square inch could be built up if the valve 146 were not provided to relieve the pressure. Such high pressures would damage the apparatus and the spring 148 is therefore made of such strength as to allow the oil to escape past the valve 146 to the sump at approximately 300 pounds per square inch pressure, which pressure would not damage the apparatus and would also preclude the possibility of escape of oil past the valve 146 under the 190 pound pressure developed during the reverse feed portion of the cycle.

After completion of the rapid forward traverse portion of the cycle, the roller 130 on the arm 128 will, when the taps are about to engage in the work, contact with the cam 132 and swing the arm 126 clockwise to close off communication between the upper and lower ends of the cylinder 86 through the passageway 96.2, 96.3, annulus 98.8, annular groove 98.1 and port 98.2.

As a result, the rate at which the table will continue its upward traverse will be determined by the rate at which the oil is permitted to flow through the feed aperture valve 196 in the same manner as above described with reference to the feeding portion of the drilling cycle. As previously stated, the feed aperture valve 196 is adjusted so that the table feeds upward slightly slower than the rate at which the taps enter the work. This causes the float in the tap holder to pull out slightly. During this forward feed portion of the tapping cycle oil is drawn into the lower end of the hydraulic cylinder 86 from the sump through port 156S, past check valve 154, chamber 98.7, duct 98.5, passageway 98.3, and conduit 98.

When the table reaches the upper end of its stroke, the limit switch LSR will be operated by the engagement of the adjustable stop 54 with the roller on the arm 50, and thereby move the switch from the position in which it is shown in full lines in Fig. 13 to the dotted line position. Such movement of the switch LSR causes energization of the reverse relay 234 and consequent de-energization of the forward relay 230, as well as de-energization of the solenoid 114. As a result, downward movement of the table commences in the same manner as previously described with reference to the operations which take place at the end of the feed portion of the drilling cycle, and the direction of rotation of motor 26 is reversed.

However, when the selector valve 160 is set for a tapping operation, the initial portion of the downward stroke of the table is at a controlled reverse feed rate determined in the following manner, reference being had to Fig. 12. Oil from the lower end of the hydraulic cylinder 86 flows outwardly through port 98 and conduit 98.4 to the passageway 98.3. It cannot, however, flow from the passageway 98.3 to the passageway 96.2 since such flow is cut off by the feed valve 138. The oil must therefore escape from the passageway 98.3 through the passageway 98.5, conduit 98.10 to the transfer valve cylinder 164, moving the transfer valve 166 to the right and flowing thence through the passageway 178 through the ports 190 of the governor valve 180 into the space 192 from which the oil flows through the groove 210, port 212 and passageway 214S to the sump.

Since upon the downward movement of the piston 99 less oil will be displaced per unit of distance traveled downwardly by the table 38 than is displaced upon the upward movement of this piston (due to the fact that the piston rod is made of two diameters), and since the forward feed and reverse feed portions of the cycle are controlled by the flow of oil through the same feed aperture valve, the downward feeding movement of the table will be more rapid than the upward feeding movement thereof, and this movement will be at about the same rate as the taps feed out of the work. Therefore, when the reverse feeding portion of the cycle is completed, the floating tap holders will be in substantially the same position with respect to their spindles as when the forward feeding portion of the cycle was completed.

During the downward feeding portion of the cycle, oil from the sump is admitted to the upper end of the hydraulic cylinder 86 through passageway 176S past check valve 172, port 96.9 and passageway 96.2.

As soon as the reverse feed portion of the cycle has been completed, the feed valve 138 will move outwardly, due to the disengagement of the roller 130 from the cam 132 of the adjustable dog, whereupon it will be noted that the lower end of the hydraulic cylinder 86 will be in direct communication with the upper end thereof through port 98, conduit 98.4, passageway 98.3, annular groove 98.1, annulus 98.8 of the feed valve 138, and hence through annulus 96.1, port 96.3, passageway 96.2 and conduit 96.4 to the port 96 at the upper end of the cylinder 86. Since the oil displaced from the bottom of the cylinder is insufficient to fill the space displaced above the piston 99, additional oil may continue to flow into the upper end of the cylinder past the check valve 172 as during the reverse feed portion of the cycle.

When the table reaches the lower end of its stroke, it will be arrested by engagement with the stop on the cover portion 42 and will operate the reverse limit switch LSR in the manner as previously described with reference to the completion of the drilling cycle.

Whenever drilling operations are to be performed, the lever 226 may be moved to its dotted line position (Fig. 13) causing the motor 26 to rotate continuously at high speed. The other forward and reversing circuits are thus ineffective to cause stopping and reversal of the motor. The relays, however, operate in the manner previously described, their only effect being to control the energization and de-energization of the air valve solenoid 114.

If at any time during the upstroke of the table, the operator removes his foot from the button 240, it will be apparent that the winding of the forward relay 230 will be de-energized, with the result that the motor will be stopped, the solenoid 114 de-energized, and the table will thus be moved downwardly in feed reverse. The switch LSM thus constitutes a safety or "dead man" control which is effective to stop the rotation of the tools and reverse the table whenever operator releases the push button 240.

If, for any reason, the limit switch LSR should fail to function on the upstroke of the table, movement of the table will be stopped by engagement of the hydraulic piston 99 with the hydraulic cylinder head 88.

It will be observed that I have provided a machine tool which is substantially fully automatic and which nevertheless is very simple in construction. Since the hydraulic system acts in effect only as a brake upon the pneumatic actuating apparatus, the necessity of supplying an oil pump, and power means for operating it, is avoided. The electric motor need be only of sufficient power to drive the tools. The compressed air supply providing the power for raising and lowering the table is usually conveniently available in establishments where the machine tool is usable.

While my invention is disclosed herein as applied to the actuation of a work piece supporting table to and from the tools, it will be readily apparent that most of the principles thereof may be utilized in a machine tool in which the work is held stationary, and the tools are fed to and from the work. Similarly, although in the foregoing description and in the following claims the cylinders are specified as being stationary and their pistons as being movable, it will be readily apparent to those skilled in the art that most of the principles of my invention may be utilized in a reversal of this construction, that is, one in which the pistons are fixed and the cylinder is movable. It is therefore intended that the claims be read to include such reversal within their scope.

While I have shown and described a particular embodiment of my invention, it will be apparent to those skilled in the art that numerous modifications and variations thereof may be made without departing from the fundamental principles of the invention. I therefore desire by the following claims to include within the scope of my invention all such modified and similar apparatus whereby substantially the results of my invention may be obtained in a similar manner by substantially the same or equivalent means.

I claim:

1. In a machine tool having a part to be reciprocated to cause relative movement between the tools and a work piece, a pair of cylinders, rigidly connected pistons in said cylinders for reciprocating said part, a source of air under pressure, a valve controlling connection of the opposite ends of one of said cylinders respectively with said source and the atmosphere, and a hydraulic valve mechanism for controlling the admission and discharge of a hydraulic fluid to the opposite ends of the other of said cylinders, said mechanism comprising a passageway connecting the opposite ends of said hydraulic cylinder, a feed valve operable to close said passageway when said part reaches a predetermined position, a passageway controlling the rate of discharge of hydraulic fluid from one end of said hydraulic cylinder, and a check valve controlled passageway for supplying the hydraulic fluid to the other end of said hydraulic cylinder.

2. In a machine tool for performing tapping operations and having a part reciprocable to cause relative movement between the taps and the work, the combination of a pneumatic piston and cylinder for producing such relative movement, said piston and cylinder inherently operating at an uncontrolled speed, means for controlling the speed of such movement including a hydraulic piston and cylinder, a rod for said hydraulic piston, said rod having portions of different cross-sectional areas projecting through the ends of said controlling cylinder, metering means for controlling the rate of flow of hydraulic fluid from said controlling cylinder, and valve means connecting said metering means to one end of said controlling cylinder when said controlling piston is moved in one direction and connecting said metering means to the opposite end of said controlling cylinder when said controlling piston is moved in the opposite direction, whereby said metering means will determine different speeds depending upon the direction of movement of said controlling piston.

3. In a hydraulic apparatus for controlling the speed of forward and reverse movement of a reciprocatory part, a cylinder, a piston reciprocable therein and connected to said part, a reservoir containing a hydraulic fluid, a passageway connected with one end of said cylinder, a duct connected with the other end of said cylinder, a valve controlling communication between said duct and said passageway, spring pressed check valves for admitting hydraulic fluid from said reservoir to said duct and passageway respectively, a metering valve, and a throw-over valve responsive to the relative pressures in said duct and said passageway for connecting the one containing fluid under the higher pressure to said metering valve.

4. In a hydraulic apparatus for controlling the speed of forward and reverse movement of a reciprocatory part, a cylinder, a piston reciprocable therein and connected to said part, a reservoir containing a hydraulic fluid, a passageway connected with one end of said cylinder, a duct connected with the other end of said cylinder, a valve controlling communication between said duct and said passageway, spring pressed check valves for admitting hydraulic fluid from said reservoir to said duct and passageway respectively, a metering valve, a governor valve connected to said metering valve for maintaining constant the pressure of the fluid supplied thereto, and means for alternatively connecting said duct and passageway to said governor valve.

5. A hydraulic control apparatus comprising a cylinder, a piston reciprocable therein, a control panel, conduits connecting the ends of said cylinder to said control panel, a passageway in said panel and connecting said conduits, a valve for closing said passageway, a reservoir, a duct connecting one of said conduits to said reservoir, a check valve preventing flow from said last named conduit to said reservoir through said duct but permitting flow in the opposite direction, a passageway forming a path for flow from the other of said conduits to said reservoir, and an adjustable flow metering restriction in said last named passageway.

6. In a drilling and tapping machine having a part moved through a reciprocatory cycle to cause engagement of the tools with the work, pneumatic means for actuating said part through its cycle, and means to control the rate of movement of said part, said means comprising, a hydraulic cylinder, a piston reciprocable in said cylinder and connected to said part, a passageway interconnecting the ends of said cylinder, a valve in said passageway, means moving with said part to close said valve, a metering restriction, and means to cause flow of the hydraulic fluid from the forward end of said cylinder through said metering restriction during the forward stroke of said piston while said valve is closed and to cause flow from the reverse end of said cylinder through said metering restriction during the reverse stroke of said piston while said valve is closed.

7. In a drilling and tapping machine having a part moved through a reciprocatory cycle to cause engagement of the tools with the work, pneumatic means for actuating said part through its cycle, and means to control the rate of movement of said part, said means comprising, a hydraulic cylinder, a differential piston and cylinder connected to control the movement of said part, said piston having its larger area facing in the direction of its forward stroke, adjustable hydraulic means governing the rate at which hydraulic fluid may flow from the forward end of said cylinder during the forward stroke of said piston and governing the rate at which oil may flow from the reverse end of said cylinder during the reverse stroke of said piston, and transfer valve means causing the hydraulic fluid to flow to said governing means from the forward end of said cylinder during the forward stroke of said piston and causing flow to said governing means from the reverse end of said cylinder during the reverse stroke of said piston, said governing means causing more rapid feed of said piston upon the reverse stroke of said piston than upon the forward feed stroke thereof due to the differential character of said piston.

8. In a tapping machine tool having a part to be reciprocated to cause relative movement between the tap and the work, the combination of pneumatic means for reciprocating said part, a hydraulic differential piston and cylinder for controlling the speed of operation of said pneumatic means, the amount of fluid displaced from said cylinder upon movement of said table in a forward direction being greater than that displaced upon the movement thereof in the reverse direction, metering means effective to control the rate of escape of hydraulic fluid from the end of said cylinder in which the fluid is under pressure, and a hydraulically operated transfer valve for connecting said metering means to that end of said cylinder in which the hydraulic fluid is at the higher pressure, whereby said part will move at a higher speed in the reverse direction than in the forward direction.

9. In a hydraulic apparatus for controlling the speed of forward and reverse movement of a reciprocatory part, a relatively movable piston and cylinder connected to reciprocate with said part, a reservoir containing hydraulic fluid, means forming a passageway connecting the opposite ends of said cylinder, a pair of check valved ducts connected between said reservoir and said passageway to permit flow of hydraulic fluid from said reservoir to said passageway and to prevent flow in a reverse direction, a valve in said passageway intermediate the points at which said check valved ducts communicate therewith, a hydraulic flow metering device, and a transfer valve for automatically connecting said metering device to whichever of the ends of said cylinder contains hydraulic fluid at the higher pressure.

RALPH RODAL.